United States Patent
Mueller (10) Patent No.: US 7,163,099 B2
(45) Date of Patent: Jan. 16, 2007

(54) STORAGE DEVICE WITH VARIABLE STORAGE CAPACITY

(75) Inventor: Thomas Mueller, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 252 days.

(21) Appl. No.: 10/770,442

(22) Filed: Feb. 4, 2004

(65) Prior Publication Data

US 2004/0245271 A1 Dec. 9, 2004

(30) Foreign Application Priority Data

Feb. 5, 2003 (EP) .................................. 03090031

(51) Int. Cl.
 *B65G 1/00* (2006.01)
(52) U.S. Cl. .............................. 198/347.3; 198/347.1; 198/347.4; 198/778; 198/812
(58) Field of Classification Search ............. 198/347.1, 198/347.3, 347.4, 778, 812
See application file for complete search history.

(56) References Cited

U.S. PATENT DOCUMENTS

| | | | | | |
|---|---|---|---|---|---|
| 4,254,858 | A | * | 3/1981 | Seragnoli ................. | 198/347.3 |
| 4,339,025 | A | * | 7/1982 | McCombie .............. | 198/347.3 |
| 5,361,888 | A | * | 11/1994 | Brown et al. ............. | 198/347.3 |
| 5,680,923 | A | * | 10/1997 | Gram ......................... | 198/778 |
| 5,845,765 | A | * | 12/1998 | Gram ......................... | 198/778 |
| 6,053,304 | A | * | 4/2000 | Biagiotti ..................... | 198/794 |
| 6,065,585 | A | * | 5/2000 | Bryant et al. ............. | 198/347.1 |
| 6,422,380 | B1 | | 7/2002 | Sikora | |
| 6,793,062 | B1 | * | 9/2004 | Hammock et al. ........ | 198/347.1 |
| 6,913,132 | B1 | * | 7/2005 | Spatafora .................. | 198/347.1 |
| 7,011,205 | B1 | * | 3/2006 | Draghetti et al. ........... | 198/778 |
| 2003/0019718 | A1 | | 1/2003 | Draghetti | |

FOREIGN PATENT DOCUMENTS

| | | |
|---|---|---|
| DE | 4302745 | 8/1993 |
| EP | 0738478 | 10/1996 |
| EP | 1059853 | 12/2000 |
| EP | 1273537 | 1/2003 |
| WO | 99/44446 | 9/1999 |
| WO | 02085144 | 10/2002 |

* cited by examiner

*Primary Examiner*—Douglas A. Hess
(74) *Attorney, Agent, or Firm*—Greenblum & Bernstein, P.L.C.

(57) ABSTRACT

Storage device with variable storage capacity. The storage device includes an input area, an output area, a continuous conveying element connecting the input area to the output area. The continuous conveying element is guided by guide elements in a looping manner from the input area to the output area, whereby the continuous conveying element defines a multi-layered storage area adapted to store products and a multi-layered return area adapted to be free of products. The multi-layered storage and return areas are arranged side by side and change in length depending on a state of fullness of the storage device while an overall length of the continuous conveying element remains generally constant. At least one storage layer of the multi-layered storage area and at least one storage layer of the multi-layered return area is arranged on a common horizontal plane. This Abstract is not intended to define the invention disclosed in the specification, nor intended to limit the scope of the invention in any way.

39 Claims, 6 Drawing Sheets

STORAGE DEVICE WITH VARIABLE STORAGE CAPACITY

CROSS-REFERENCE TO RELATED APPLICATIONS

The present application claims priority under 35 U.S.C. §119 of European Patent Application No. 03 09 0031.0, filed on Feb. 5, 2003, the disclosure of which is expressly incorporated by reference herein in its entirety.

BACKGROUND OF THE INVENTION

1. Field of the Invention

The invention is concerned with a storage device with variable storage capacity, in particular for storing rod-shaped products, with an input area, an output area and also a continuous conveying element connecting the input area to the output area, in such a way that the storage device operates on the principle of "first in-first out" (FiFo store). The conveying element, which is guided by way of guide elements in a loop from the input area to the output area, has a multi-layered storage area, normally provided with products, namely a so-called full strand, and a multi-layered return area, normally free of products, namely a so-called empty strand. The two areas being compensated in length, depending on the state of fullness of the storage device, in such a way that the overall length of the conveying element is constant.

2. Discussion of Background Information

Storage devices of this kind are used in particular in the domain of the tobacco-processing industry and connect production machines, e.g., a cigarette-making machine—also designated below as a "maker"—to a cigarette-packing machine—also designated below as a "packer". The task of the storage device is to bridge short stoppage times of the maker or packer without the entire production line having to be halted. In this way, continuous production is guaranteed. During operation of the production line, the state of fullness of the storage device changes as a function of breakdown or stoppage times of individual components. In the event that e.g., the packer, which is arranged downstream of the storage device, breaks down, the storage device fills to a storage maximum in that the length of the full strand increases with simultaneous shortening of the empty strand. If the maker connected upstream of the storage device breaks down, operation of the production line is maintained at least temporarily in that the packer receives the products from the storage device until the storage minimum has been reached. Owing to the constant release of products from the storage device—with a simultaneous lack of delivery of products into the storage device—the length of the full strand is reduced, while the length of the empty strand lengthens correspondingly, so the overall length of the circulating conveying element is therefore always constant. The conveying element is therein wound in a loop to create as long as possible a storage or transport path.

In a known storage device, the full strand and the empty strand are arranged above one another, i.e., in different planes from one another. Therefore two guide elements necessary for guiding and reversing the conveying element are needed in each case both for the full strand and for the empty strand. The conveying element also has to be steered from the lower to the upper plane and back, requiring additional structural outlay. On the one hand, this has the disadvantage that the known storage device has a great overall height, making it difficult or completely impossible to use, especially in factory halls with a low ceiling height. On the other hand, maintenance or servicing of a storage device of this kind is very complicated, as individual parts are sometimes difficult to access. Furthermore, the known storage device has a great multiplicity of parts, leading to high manufacturing costs.

The same applies to a further known storage device in which the full strand and the empty strand are basically arranged side by side. However, the full strand and the empty strand superimpose one another or cross one another in the area of a common guide element, so that the full strand and the empty strand are arranged above one another at least in the area of the common guide element. This has, on the one hand, the disadvantage that the overall height of the known storage device is considerable and, indeed, is conditional on layering, either in blocks or alternately, of the individual windings of the full strand and the empty strand in the area of the common guide element. On the other hand, the known structure requires a multiplicity of reversals or reversing devices, leading to a great multiplicity of parts.

SUMMARY OF THE INVENTION

The present invention provides an economical and technically simple storage device which safely and reliably guarantees the transport of sensitive products.

The invention therefore provides for a device wherein the full strand and the empty strand are arranged side by side in a common horizontal plane, wherein to each layer of the full strand is allocated a corresponding layer of the empty strand in the same plane. In this way, on the one hand, a compact storage device is created which has a small overall height, as a "multi-storey" structure is avoided. The constructional size is also reduced in relation to the length of the storage device owing to the interleaved structure of the full strand and the empty strand in comparison to the known solutions, yet with the same storage capacity. The loop-type guiding of the full strand, on the one hand, and the meander-shaped guiding of the empty strand, on the other hand, enable a reduction in the dimensions of the store in a particularly efficient and simple way. On the other hand, the configuration of the storage device according to the invention also achieves an appreciable reduction in parts, which, on the one hand, lowers manufacturing costs and, on the other hand, reduces maintenance expenditure. A particular advantage of the storage device according to the invention is that the running direction of the conveying element can be freely chosen, so the multiplicity of layouts, and therefore the range of use for this storage device, is increased. By allocating one layer of the full strand and of the empty strand in one plane in each case, crossings over of the individual areas of the conveying element are additionally avoided, increasing the safety and reliability of the storage device.

In a preferred embodiment of the invention the movable plate towers of the empty strand and the movable disc tower of the full strand are arranged on a common slide and movable as a unit. Utilizing this arrangement, particularly simple and stable guiding of the plate towers and the disc tower can be guaranteed, a reduction in parts being achieved by the commonly used slide.

Advantageously, the plates of the plate towers have a considerably smaller diameter than the storage discs of the disc towers. This enables further reduction of the constructional size of the storage device in length in a simple manner, especially as even more effective interleaving of the full strand with the empty strand is achieved, since the plates are constructed smaller than the storage discs.

A further development of the invention shows a storage device in which a stationary inlet disc is arranged above the disc towers and an outlet disc is arranged below the stationary disc tower. The inlet disc and the outlet disc simplify the filling or emptying of the storage device, in particular if the diameter of the inlet disc is greater than the diameter of the outlet disc and the diameter of the outlet disc is greater than the diameter of the storage discs. In this way, namely, two additional vertical planes emerge, one of which serves as input and the other as output plane. The positioning of the input and output points can therefore be freely chosen, which again increases the flexibility of the layout.

In a further preferred configuration of the storage device according to the invention all the spindles of the plate towers and the disc towers are supported in each case on both their ends. By avoiding floating bearings, the stability of the storage device is increased, reducing the susceptibility to breakdown and therefore maintenance expenditure and also enabling a simpler method of construction, as the bearing points of the spindles are virtually moment-free.

A tensioning device for the conveying element is preferably provided in the area of the empty strand. In combination with the arrangement of the full strand and the empty strand in one plane, only low friction forces have to be overcome in order to tension the conveying element by traction on the conveying element itself, in particular in the area of the empty strand.

The invention also provides for a storage device with variable storage capacity, wherein the storage device comprises an input area, an output area, a continuous conveying element connecting the input area to the output area. The continuous conveying element is guided by guide elements in a looping manner from the input area to the output area, whereby the continuous conveying element defines a multi-layered storage area adapted to store products and a multi-layered return area adapted to be free of products. The multi-layered storage and return areas are arranged side by side and change in length depending on a state of fullness of the storage device while an overall length of the continuous conveying element remains generally constant. At least one storage layer of the multi-layered storage area and at least one storage layer of the multi-layered return area is arranged on a common horizontal plane.

The storage device may be adapted to store rod-shaped products. The storage device may function on a first in-first out manner. The multi-layered storage area may comprise a full strand. The multi-layered return area may comprise an empty strand. Each storage layer of the multi-layered storage area and each storage layer of the multi-layered return area may be arranged on a common horizontal plane. The multi-layered storage area and the multi-layered return area may comprise separate guide elements.

The guide elements of the multi-layered storage area may be arranged on two disc towers. Each of the two disc towers may comprise a plurality of rotatably mounted storage discs arranged on a vertical spindle. At least one of the two disc towers may move relative to the other of the two disc towers. A first of the two disc towers may be a stationary disc tower and a second of the two disc towers may be a linearly movable disc tower. The second disc tower may be movable along a generally horizontal plane.

At least some of the guide elements may be arranged on the multi-layered return area and are mounted on two plate towers. Each of the two plate towers may comprise a plurality of rotatably mounted plates arranged on a vertical spindle. At least one of the two plate towers may be movably mounted. Each of the two plate towers may be movable along a generally horizontal plane.

The device may further comprise a movable common slide unit comprising a plurality of plate towers a disc tower. Each plate tower may comprise a plurality of plates and the disc tower comprises a plurality of storage discs. Each of the plurality of plates may comprise a diameter that is substantially smaller than a diameter of the plurality of storage discs. At least some of the guide element may comprise a plurality of stationary rotatably mounted reversing rollers. Each of the plurality of stationary rotatably mounted reversing rollers may be mounted on a horizontal spindle. The continuous conveying element may comprise a continuous chain.

The device may further comprise a drive for driving the continuous conveying element, wherein the drive is arranged in the input area. The device may further comprising a drive for driving the continuous conveying element, wherein the drive is arranged in the output area. The device may further comprise a first drive for driving the continuous conveying element arranged in the input area and a second drive for driving the continuous conveying element arranged in the output area.

The guide elements may comprise a movable disc tower and an inlet disc arranged above a stationary disc tower and an outlet disc, wherein a diameter of the inlet disc is greater than a diameter of the outlet disc, and wherein the diameter of the outlet disc is greater than a diameter of storage discs of each of the movable and stationary disc towers.

The guide elements may comprise an inlet disc arranged above a stationary disc tower and an outlet disc, wherein a diameter of the inlet disc is greater than a diameter of the outlet disc, and wherein the diameter of the outlet disc is greater than a diameter of storage discs of the stationary disc tower. The storage discs of the stationary disc tower, the inlet disc and the outlet disc may be inclined at an angle relative to a generally horizontal plane. The angle may comprise approximately 3.5 degrees.

The guide elements may comprise a stationary disc tower, a movable disc tower, and a plurality of plate towers supported on spindles.

The device may further comprise guide sheets, wherein the continuous conveying element is guided along two longitudinal sides of the storage device via the guide sheets.

The device may further comprise a system for varying the length of the multi-layered storage area and the multi-layered return area, whereby the system is adapted to vary a storage capacity of the storage device. The system may be adapted to vary the storage capacity automatically. The system may regulate a difference in speed between a drive arranged in the input area and a drive arranged in the output area.

The device may further comprise at least one tensioning system adapted to tension the continuous conveying element. The at least one tensioning system may comprise a frame, a tensioning bar, a weight, a tension member, a tensioning roller, and a reversing roller.

The invention also provides for a method of storing rod-shaped products using the device described above, wherein the method comprises feeding the rod-shaped products to the input area, positioning the rod-shaped articles onto the continuous conveying element, and guiding the continuous conveying element with the guide elements to the output area.

The invention also provides for a method of conveying rod-shaped products between a first machine and a second machine using the device described above, wherein the method comprises feeding, from the first machine, the rod-shaped products to the input area, positioning the rod-shaped articles onto the continuous conveying element, guiding the continuous conveying element with the guide elements to the output area, and feeding, from the output area, the rod-shaped products to the second machine.

The invention also provides for a method of conveying rod-shaped products between a cigarette making machine and a cigarette packing machine using the device described above, wherein the method comprises feeding, from the cigarette making machine, the rod-shaped products to the input area, positioning the rod-shaped articles onto the continuous conveying element, guiding the continuous conveying element with the guide elements to the output area, and feeding, from the output area, the rod-shaped products to the cigarette packing machine.

The invention also provides for a storage device with variable storage capacity, wherein the storage device comprises a frame comprising longitudinal members, a stationary disc tower comprising a spindle and a plurality of storage discs, a movable disc tower comprising a spindle and a plurality of storage discs, a plurality of reversing rollers, an input area arranged adjacent an input disc, an output area arranged adjacent an output disc, and a continuous conveying element that is guided by each of the storage discs of the stationary and movable disc towers, the reversing rollers, and the input and output discs. The continuous conveying element is guided in a looping manner from the input area to the output area, whereby the continuous conveying element defines a multi-layered storage area adapted to store products and a multi-layered return area adapted to be free of products.

The multi-layered storage and return areas may be arranged side by side and change in length depending on a state of fullness of the storage device while an overall length of the continuous conveying element remains generally constant. At least one storage layer of the multi-layered storage area and at least one storage layer of the multi-layered return area may be arranged on a common horizontal plane.

The invention also provides for a method of storing rod-shaped products using the device described above, wherein the method comprises feeding the rod-shaped products to the input area, positioning the rod-shaped articles onto the continuous conveying element, and guiding the continuous conveying element with the guide elements to the output area.

The invention also provides for a method of conveying rod-shaped products between a first machine and a second machine using the device described above, wherein the method comprises feeding, from the first machine, the rod-shaped products to the input area, positioning the rod-shaped articles onto the continuous conveying element, guiding the continuous conveying element with the guide elements to the output area, and feeding, from the output area, the rod-shaped products to the second machine.

The invention also provides for a method of conveying rod-shaped products between a cigarette making machine and a cigarette packing machine using the device described above, wherein the method comprises feeding, from the cigarette making machine, the rod-shaped products to the input area, positioning the rod-shaped articles to the continuous conveying element, guiding the continuous conveying element with the guide elements to the output area, and feeding, from the output area, the rod-shaped products to the cigarette packing machine.

The invention also provides for a storage device with variable storage capacity, wherein the storage device comprises a frame comprising longitudinal members arranged generally parallel to one another, a first end and a second end, a stationary disc tower arranged in an area of the first end of the frame and comprising a spindle and a plurality of storage discs, a plurality of reversing rollers arranged in an area of the second end of the frame, a movable disc tower arranged between the first and second ends of the frame and comprising a spindle and a plurality of storage discs, an input area arranged adjacent an input disc, an output area arranged adjacent an output disc, a continuous conveying element that is guided by each of the storage discs of the stationary and movable disc towers, the reversing rollers, and the input and output discs, and a system for controlling a sliding movement of the movable disc tower. The continuous conveying element is guided in a looping manner from the input area to the output area, whereby the continuous conveying element defines a multi-layered storage area adapted to store products and a multi-layered return area adapted to be free of products.

The multi-layered storage and return areas may be arranged side by side and change in length depending on a state of fullness of the storage device while an overall length of the continuous conveying element remains generally constant. At least one storage layer of the multi-layered storage area and at least one storage layer of the multi-layered return area may be arranged on a common horizontal plane.

The invention also provides for a method of storing rod-shaped products using the device described above, wherein the method comprises feeding the rod-shaped products to the input area, positioning the rod-shaped articles onto the continuous conveying element, and guiding the continuous conveying element with the guide elements to the output area.

The invention also provides for a method of conveying rod-shaped products between a first machine and a second machine using the device described above, wherein the method comprises feeding, from the first machine, the rod-shaped products to the input area, positioning the rod-shaped articles to the continuous conveying element, guiding the continuous conveying element with the guide elements to the output area, and feeding, from the output area, the rod-shaped products to the second machine.

The invention also provides for a method of conveying rod-shaped products between a cigarette making machine and a cigarette packing machine using the device described above, wherein the method comprises feeding, from the cigarette making machine, the rod-shaped products to the input area, positioning the rod-shaped articles onto the continuous conveying element, guiding the continuous conveying element with the guide elements to the output area, and feeding, from the output area, the rod-shaped products to the cigarette packing machine.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The storage device described below with reference to FIGS. 1–7 serves as linking element between a first (not illustrated) cigarette-making machine, e.g., a maker, and a second (not illustrated) cigarette-packing machine, e.g., a packer. The storage device is suitable in particular for conveying and storing cigarettes in a self-contained maker/packer connection, a so-called hard link. However, other methods of use for the storage device described are also possible.

The storage device 10 (also designated as a store) has a basic frame 11, formed from two elongated longitudinal profiles 12, 13 and several cross-profiles or traverses 14 which connect the longitudinal profiles 12, 13. The profiles 12, 13 are located parallel opposite to one another. The traverses 14 also serve to simultaneously stiffen the basic frame 11. Arranged on a front end 15 of the basic frame 11 is a carrying arm 16. The carrying arm 16, seen from the side, is formed as L-shaped member. A free side 17 of the carrying arm 16 extends substantially parallel to the longitudinal profiles 12, 13. In the area of the front end 15 a floor-plate 18 is mounted between the longitudinal profiles 12, 13. The plate 18 is arranged substantially parallel and distanced from the side 17.

Two disc towers 19, 20 are arranged between the longitudinal profiles 12, 13. One of the disc towers 19, 20, advantageously the one located in the area of the front end 15, is constructed as stationary disc tower. The disc tower 19 is formed from several storage discs 21 arranged above one another, all arranged as rotatable on a common vertical spindle 22. The spindle 22 is supported on both sides and/or ends, i.e., one end in the floor-plate 18 and another end in the side 17. The number of storage discs 21 depends on the desired maximum storage capacity of the storage device 10. With each additional storage disc 21 a new plane is generated, once again leading to an increase in the maximum storage capacity. Below the stationary disc tower 19, an outlet disc 23 is additionally arranged. The outlet disc 23 is likewise arranged as rotatable on the spindle 22. Normally, the diameter of the outlet disc 23 is greater than the diameter of the storage discs 21. Accordingly, the outlet disc 23 has a projecting portion A which projects past the storage discs 21 (see FIG. 4). Alternatively or cumulatively, the center point 24 of the outlet disc 23 can also be offset from the center point 25 of the storage discs 21. For this purpose the spindle 22 is then constructed in steps (e.g., with stepped portions), so the center or rotation points 24, 25 are different.

The other disc tower 20, arranged adjacent to disc tower 19, is constructed as movable relative to disc tower 19. Disc tower 20 likewise has several storage discs 26 arranged above one another, all arranged as rotatable on a common vertical spindle 27. The number of storage discs 26 corresponds to the number of storage discs 21. The spindle 27 is supported on both sides in a mobile slide 28. For this purpose, the slide 28 has a cover-plate 29 and a base-plate 30. Plates 29 and 30, advantageously constructed as triangular in shape, are arranged generally horizontally and parallel to one another and are spaced a distance from one another. At least the base-plate 30 is guided on two opposite sides in and/or on linear guides 31, 32. This makes the slide 28 as a whole movable in the longitudinal direction of the longitudinal profiles 12, 13, this being in a one-dimensional direction parallel to longitudinal profiles 12, 13.

Additionally arranged on the slide 28 are two plate towers 33, 34. The plate towers 33, 34 are identically constructed and in each case have a number of plates 35 or 36. The plates 35 or 36 are arranged in each case as rotatable on a vertical spindle 37 or 38. The number of plates 35 or 36 on each spindle 37 or 38 corresponds to the number of storage discs 21 or 26 on spindles 22 or 27. For example, the movable disc tower 20 can have six storage discs 26 for forming six storage planes. Corresponding to this, the stationary storage tower 19 likewise has six storage discs 21. The plate towers 33, 34, in the example mentioned, likewise have six plates 35, 36 in each case. The plates 35, 36 have a considerably smaller diameter than the storage discs 21, 26. The diameters of the storage discs 21, 26 are preferably greater by a multiple than the diameters of the plates 35, 36. Advantageously the diameters of the storage discs 21, 26 are at least double the size of the diameters of the plates 35, 36.

Figure 1:
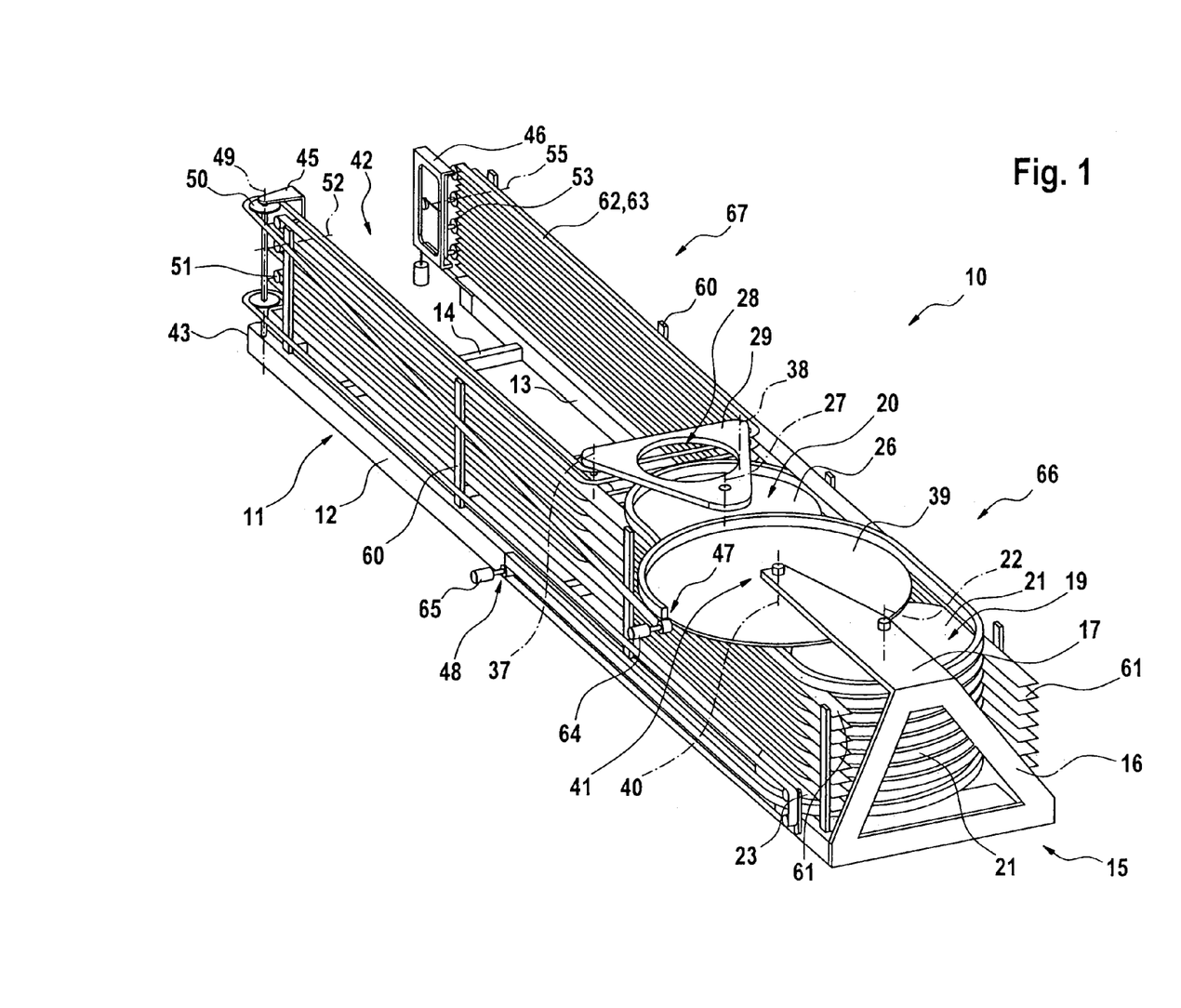
FIG. 1 shows a perspective front view of an embodiment of the storage device according to the invention from diagonally above.
Figure 2:
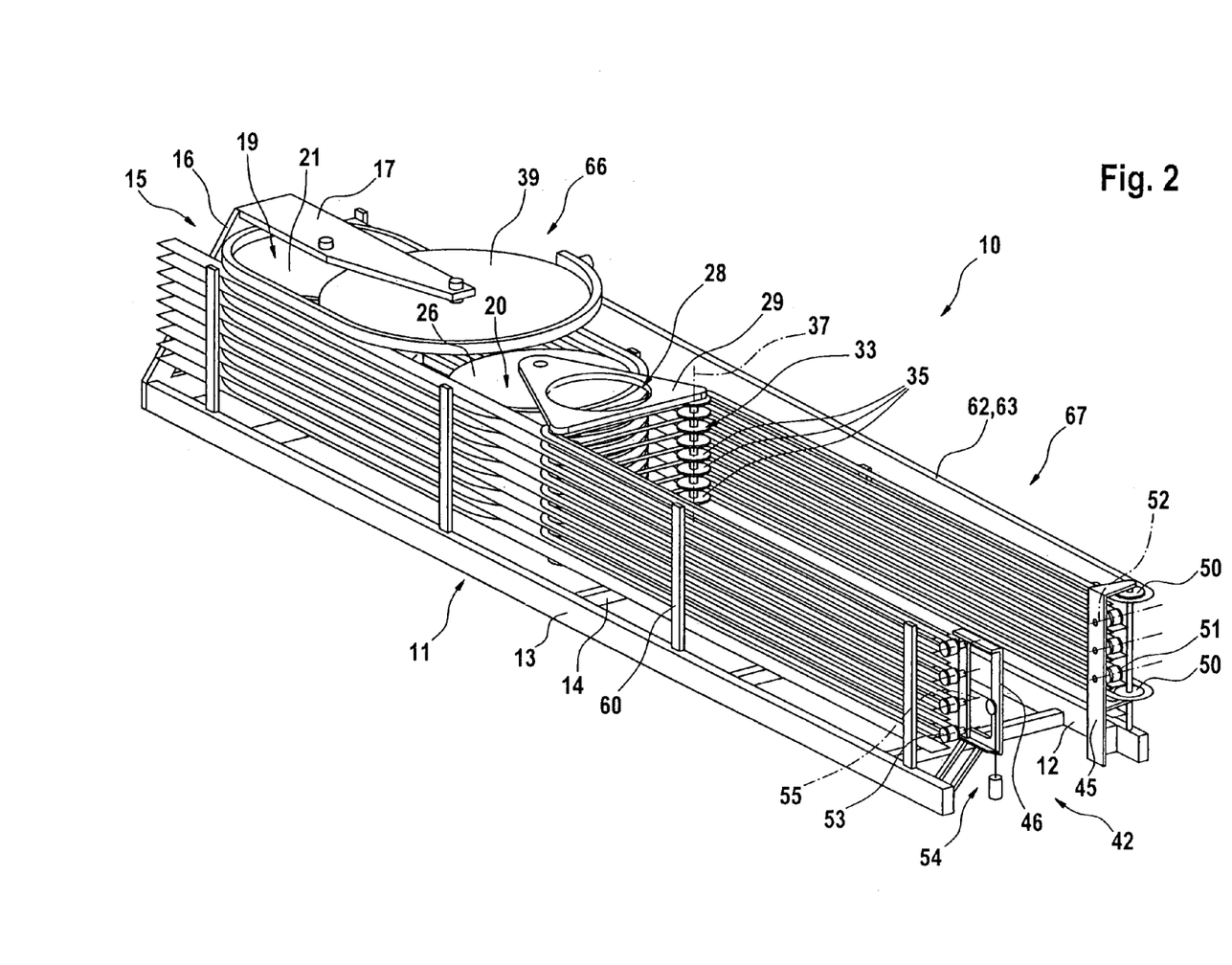
FIG. 2 shows a perspective rear view of the storage device according to FIG. 1 from diagonally above.
Figure 3:
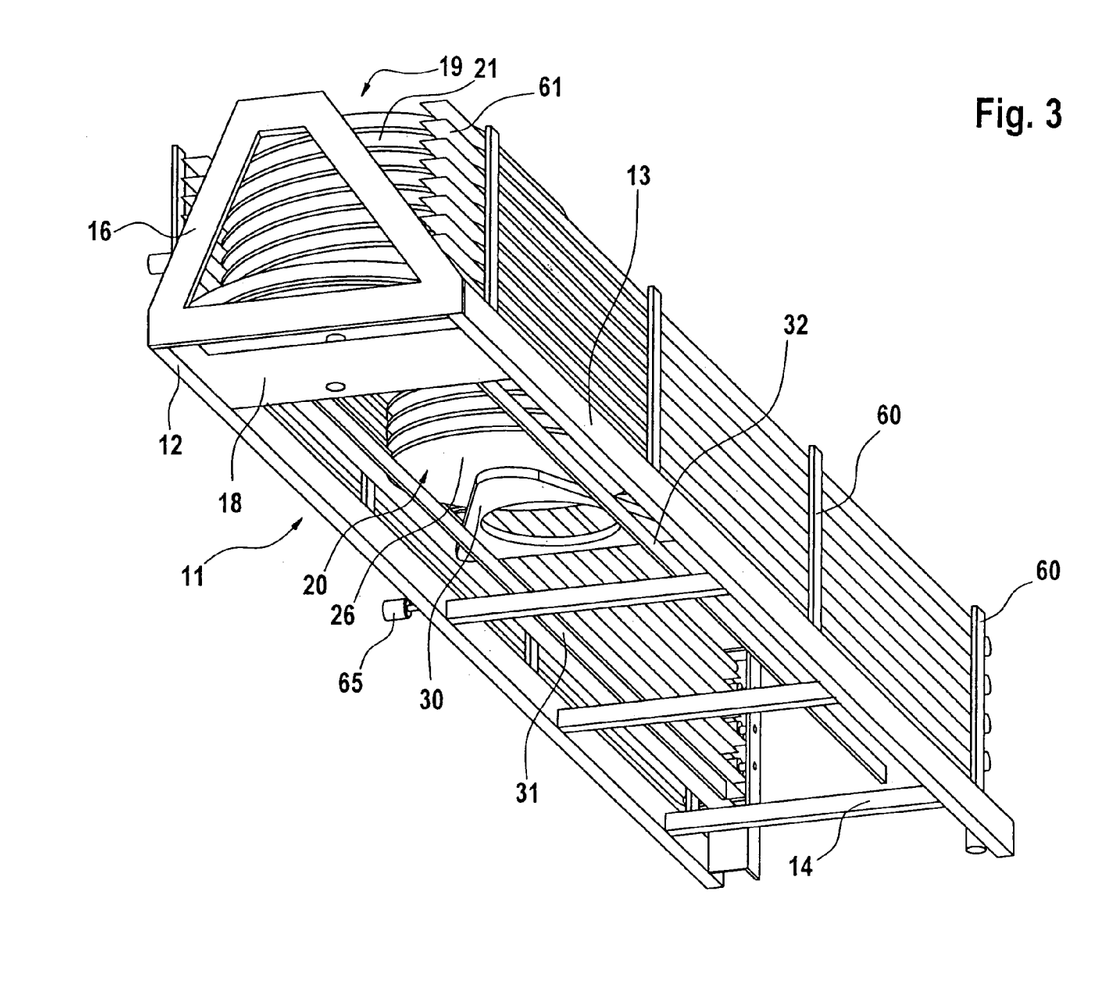
FIG. 3 shows a perspective front view of the storage device according to FIG. 1 from diagonally below.
Figure 4:
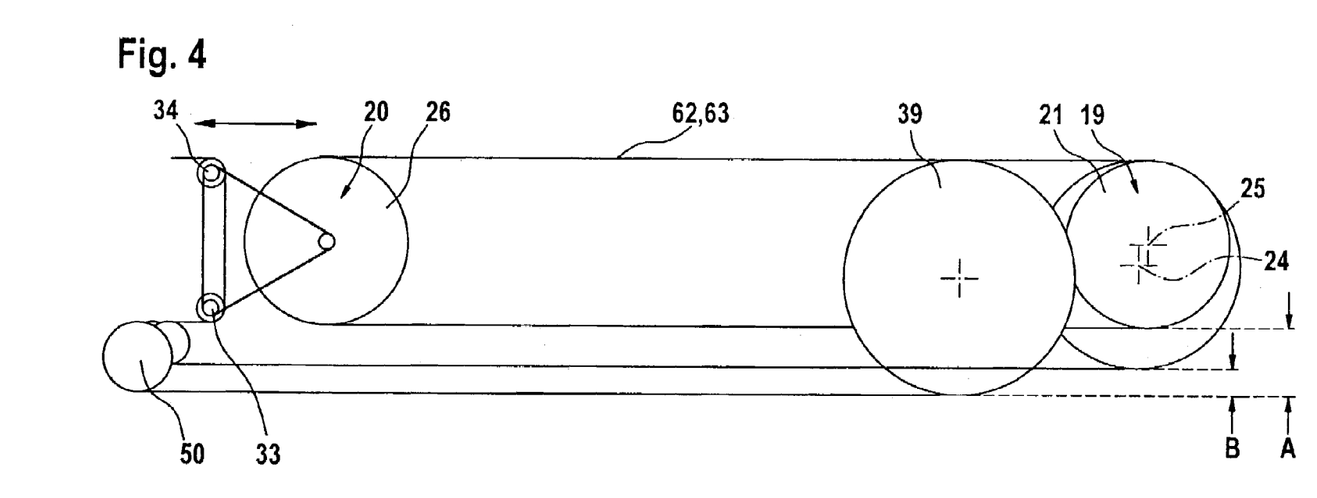
FIG. 4 shows a schematic illustration of the storage device in horizontal projection.
Figure 5:
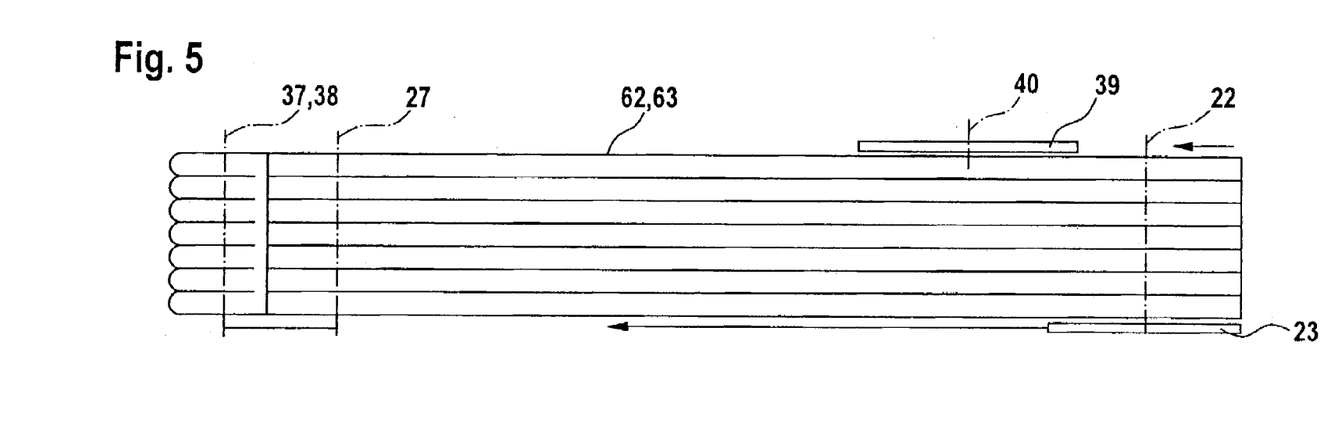
FIG. 5 shows a schematic illustration of the storage device according to FIG. 4 in side view.
Figure 6:
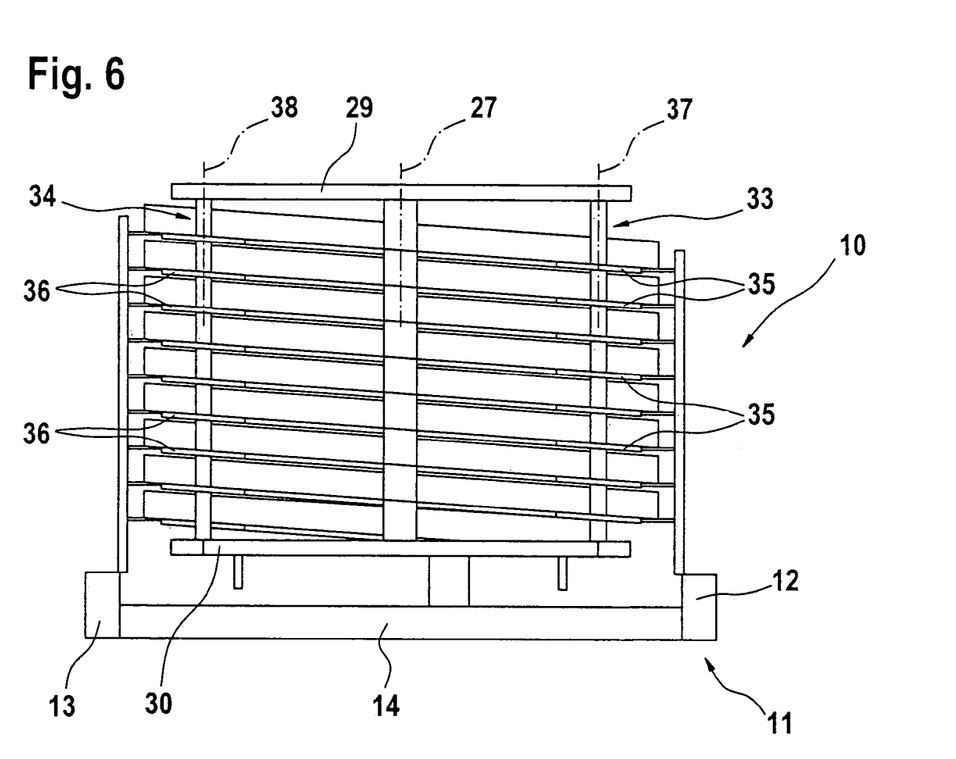
FIG. 6 shows a rear view of the storage device according to FIG. 1.
Figure 7:
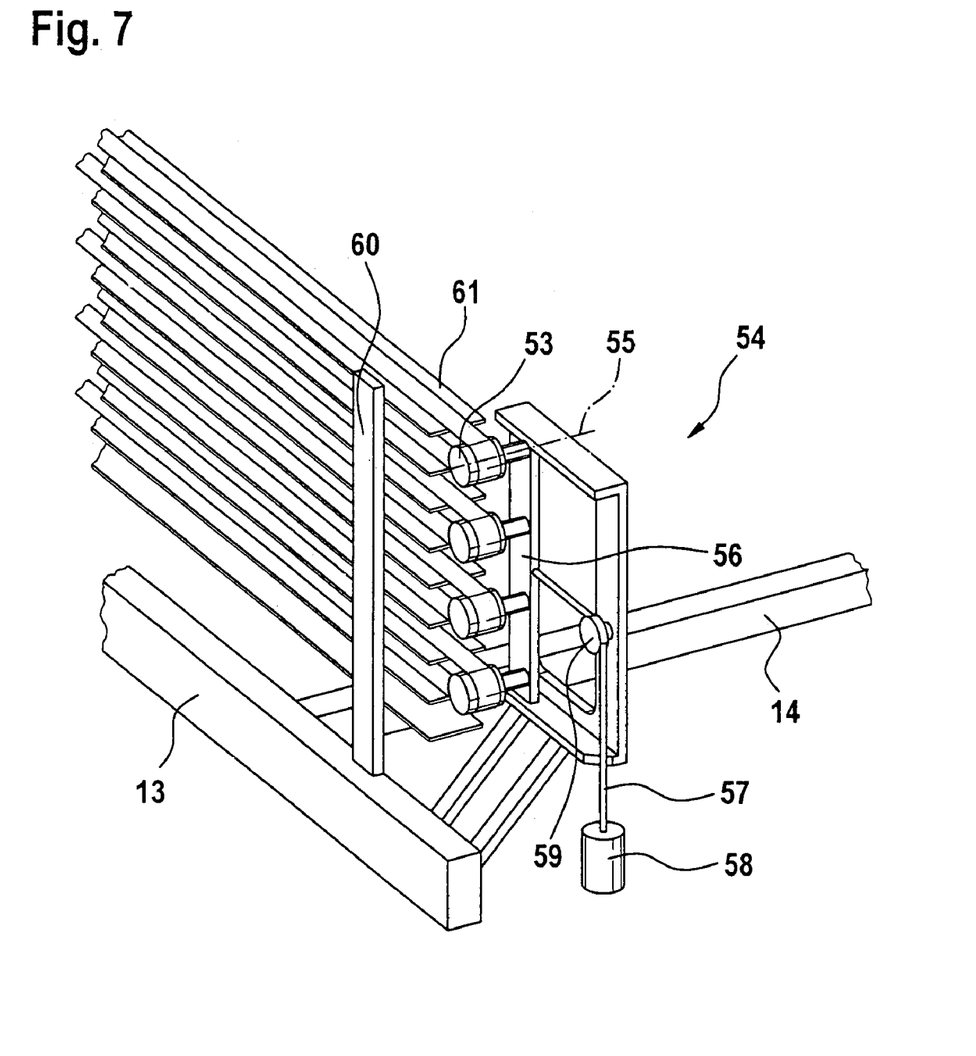
FIG. 7 shows a detail, namely the tensioning device, of the storage device according to FIG. 1 in enlarged illustration.

An inlet disc 39 is arranged above the disc towers 19, 20 (see FIG. 1). The inlet disc 39 is mounted and/or disposed on a vertical spindle 40. The spindle 40 is supported as floating on the free end 41 of the side 17. The diameter of the inlet disc 39 is greater than the diameter of the outlet disc 23, whereby a projecting portion B arises and/or results (see FIG. 4). Advantageously, projections A and B can be approximately 300 mm. However, other values can be chosen for projections A and B. In alternative embodiments the outlet disc 23 can also be greater in diameter than the inlet disc 39. However, both the inlet disc 39 and the outlet disc 23 are preferably greater in diameter than the storage discs 21, 26. Furthermore, there is also the possibility that the outlet disc 23 is arranged above the disc towers 19, 20, while the inlet disc 39 is located below the disc towers 19, 20.

Vertical frames 45, 46 are arranged on both open ends 43, 44 of the longitudinal profiles 12, 13. These frames 45, 46 are also arranged on the front end 42 of the storage device 10 opposite the carrying arm 16. Frame 45, which, advantageously but not necessarily, is arranged on the side of the storage device 10 on which there is an input area 47 and an output area 48 of the storage device 10, serves on the one hand to support a vertical spindle 49, which is supported with one end on frame 45 and with the other end on longitudinal profile 12. Two plates 50 are rotatably supported on the spindle 49. Additionally, several reversing rollers 51 are arranged above one another on the frame 45. The reversing rollers 51 are rotatably mounted in each case on a horizontal spindle 52. The number of reversing rollers 51 depends on the number of planes formed by the plates 35, 36 or storage discs 21, 26. The plates 50 are arranged above or below the reversing rollers 51 and generally or in a quasi-manner form a frame round them.

Frame 46, which is arranged on longitudinal profile 13, is likewise constructed to accommodate reversing rollers 53 and serves as tensioning system 54. The reversing rollers 53 are rotatably mounted in each case on horizontal spindles 55. The spindles 55 are arranged in a fixed manner on a tensioning bar 56, which is guided in a linearly movable manner inside frame 46. A weight 58 for tensioning a chain 63 is attached to the tensioning bar 56 via a rope 57 or similar tension member. The rope 57 is guided over a reversing roller 59. The tensioning of the chain 63 can, however, be adjusted in some other customary way, e.g., by spring force, via pneumatic or hydraulic devices, or other similar devices, etc.

In an embodiment not explicitly illustrated, the tensioning system 54 can be constructed on both sides, i.e., on both longitudinal profiles 12 and 13. In such a configuration, the frames 45, 46 would be provided with tensioning bars 56 on both longitudinal profiles 12, 13. Frame 46 with the reversing rollers 53 (see in particular FIG. 7) is constructed as described above. Construction on longitudinal profile 12 on the other hand varies in respect of the previously described embodiments. The previous frame 45 further serves to support the spindle 49 for the plates 50. However, the reversing rollers 51, which are rotatably mounted in each case on the horizontal spindle 52, are allocated to an additional tensioning bar 56 corresponding to tensioning bar 56 on the opposite side on longitudinal profile 13 and therefore given the same reference numeral. The spindles 52 are mounted as fixed on the additional tensioning bar 56, which is likewise guided as linearly movable inside the frame 45. Further construction on the side of longitudinal profile 12 corresponds to that on the side of longitudinal profile 13, which has been described in detail. The two tensioning bars 56 are optionally constructed as movable synchronously or separately from one another. Furthermore, it is also possible to construct the tensioning system 54 in such a way that each individual reversing roller 51, 53 can be tensioned independently of the other, in that, e.g., separate guides are provided for each of the reversing rollers 51, 53, in the embodiment according to FIG. 2, e.g., seven independent guides would be utilized. In other words, separate tensioning systems or devices are allocated to each plane of the storage device 10 or conveying element 62. Each of the reversing rollers 51, 53 is then in active connection with an element for applying the required or desired tensioning of a conveying element 62. This element can be a weight 58. Other customary elements for applying a force can likewise be used.

Vertical struts 60 are mounted on the longitudinal profiles 12, 13 on both sides of the storage device 10. The struts 60 serve to hold guide sheets 61. The guide sheets 61 are flat metal sheets extending linearly. They also extend virtually over the entire length of the longitudinal profiles 12, 13. Several guide sheets 61 are arranged one above the other on each side of the storage device 10. The number of guide sheets 61 depends on the number of planes of the storage device 10 which is defined by the number of plates 35, 36 or storage discs 21, 26.

The storage device 10 has a continuous chain 63 that functions as conveying element 62. The chain 63 has a constant length and is guided in the manner of a loop, starting from the input area 47, to the output area 48, round the inlet disc 39, the storage discs 21, 26, the plates 35, 36, the reversing rollers 51, 53, the plates 50 and the outlet disc 23. The chain 63 is constructed for accommodating rod-shaped products, in particular cigarettes, filters, etc., which lie on it with their longitudinal extension crosswise to the direction of transport of the chain 63. The chain 63 is guided in several planes in an oval shape, the reversing points being formed by the revolving storage discs 21, 26 and the inlet disc 39 and the outlet disc 23. In order to guide the chain 63 from one plane to the next, the storage discs 21, 26, the inlet disc 39 and the outlet disc 23 are constructed as inclined. Advantageously, the inclination is approximately 3.5° to the spindles 22 or 27. The inclination is advantageously achieved by a "crooked" bore in the storage discs 21, 26, the inlet disc 39 and the outlet disc 23. In a further embodiment, the plates 35, 36 are also constructed as inclined, this likewise being by a "crooked" bore and by the same amount of angle of approximately 3.5° as the storage discs 21, 26. In this way, the guiding of the chain between the plates 35, 36 is simplified, whereby the load on the chain can be lessened owing to reduced friction losses. The angle of inclination can, however, also be greater or smaller than approximately 3.5°.

The conveying element 62 or the chain 63 is substantially divided into two areas, namely on the one hand into the full strand 66, occupied by products during operation, with its stationary disc tower 19 and its movable disc tower 20 which changes in location, and on the other hand into the empty strand 67, which is product-free during operation, with its two plate towers 33, 34 which change location and two stationary reversing stations, formed by the reversing rollers 51 or 53 arranged on the frames 45, 46. The full strand 66 and the empty strand 67 lie completely side by side in a common plane. The full strand 66 and the empty strand 67 therein have in each case separate guide elements which can also be different from one another. The guide elements of the full strand 66 are formed by the disc towers 19, 20. The guide elements of the empty strand 67 comprise the plate towers 33, 34 and also the reversing rollers 51, 53.

The chain areas of the full strand 66 and the empty strand 67 behave in complementary manner to one another, i.e., lengthening of the full strand 66 is at the cost of the length of the empty strand 67, and vice versa. In the area of the full strand 66, the chain 63 is wound round the disc towers 19, 20 in a generally oval shape. In the area of the empty strand 67 a meander-shaped course of the chain 63 arises, owing to the plate towers 33, 34 and the reversing rollers 51, 53. To each loop or layer of the full strand 66, a loop or layer of the empty strand 67 is allocated in the same plane. In this way, the loops of the full strand 66 and the empty strand 67 located in the same plane can also use the same guides formed by the guide sheets 61.

In the layout shown in FIG. 1, as already noted to above, the input area 47 and the output area 48 are arranged on the same side of the storage device 10. Based on projection A or B of the output disc 23 or the inlet disc 39, different vertical planes emerge for the input or output of the products into the storage device 10. In the embodiment shown, the input area 47 is arranged above the storage discs 21, 26, while the output area 48 is arranged below the storage discs 21, 26.

This makes free positioning of the input and output points along a straight line possible, without loading the product with additional reversals of the mass flow. The choice of input and output height can also be freely chosen. Even the running direction of the chain 63 can be reversed. Besides the layout shown, any layouts can therefore be produced without great expenditure for changing or can be adapted to specific customer desires. For example, there is the possibility of arranging the input area 47 and the output area 48 on different sides of the storage device 10 or both areas 47 and 48 on the other side from that chosen in the embodiment shown.

A first drive 64 for the chain 63 is arranged in the input area 47. A second drive 65, also for the chain 63, is mounted in the output area. The drives 64, 65 are connected to a common control unit. The control unit enables automated compensating of the lengths of the full strand 66 and the empty strand 67 as a function of the difference in speed of the drives 64, 65. In other words, the difference in speed between the input area 47 and the output area 48 automatically effects a movement of the slide 28. At the same speed of both drives 64, 65, the storage device 10 is in a quasi stationary state. If the speed in the output area 48 is greater than in the input area 47, the full strand 66 is shortened with corresponding lengthening of the empty strand 67. If the speed in the input area 47 is greater than in the output area 48, the empty strand 67 shortens with corresponding lengthening of the full strand 66.

The storage device 10 can be constructed as a floor version. This means that the storage device 10 is mounted directly on the machines connected upstream and/or downstream or on a stanchion configuration. A version of this kind offers advantages in the elimination of breakdowns and maintenance. The storage planes are therein above the make/pack combination, guaranteeing the required through heights. The storage device 10 can, however, also be used as a ceiling version. The latter version has a very small area requirement and short paths.

The principle of the storage device 10 is described below. The mass flow, normally consisting of cigarettes lying crosswise on the chain 63, is—starting from the maker—inserted on the chain 63 in the input area 47 via the input disc 39 into the storage device 10 and guided continually through the variable storage loop consisting of full strand 66 and empty strand 67 according to the principle of first in-first out. The length of the storage loop depends on the desired maximum state of fullness of the storage device. The mass flow is transported on the chain 63 in serpentine shape, in other words, following the course of the chain 63, around the inlet disc 39 and the storage discs 21, 26 and the outlet disc 23 from the input area 47 to the output area 48 and there passed to a packer. Because of the inclination of the inlet disc 39 and the storage discs 21, 26, the chain 63 is guided from one plane to the next. Advantageously, the storage device 10 has a minimum state of fullness, so the packer is supplied with cigarettes from the storage device 10 if there is a stoppage of the maker. Owing to removal of the cigarettes from the storage device 10, —at greater speed of drive 65 than of drive 64—the length of the full strand 66 lessens, while the length of the empty strand 67—with constant overall length of the chain 63 in the overall system—is increased, whereby the slide 28 or the movable disc tower 20 moves in the direction of the stationary disc tower 19. If the storage minimum has been reached, the packer must be stopped until a preset minimum state of fullness has been reached again.

When the packer has been stopped, the state of fullness of the storage device increases, as the cigarettes are conveyed from the maker into the storage device 10. In this way the full strand 66 increases, in that the movable disc tower 20 moves away from the stationary disc tower 19. Simultaneously, the length of the empty strand 67 lessens until the storage maximum has been reached. As a special mode of operation, the separation of faulty cigarettes from the mass flow by gradual removal of the cigarettes in the area of the input area 47 is additionally preferred.

The changing length of the storage loop in the empty strand 67 or full strand 66, which depends on the state of fullness of the storage device, simultaneously leads to a change in tension of the conveying element 62, namely the chain 63. In order to avoid "sagging" of the chain 63 or too high a tension thereof, the chain tension is adjusted on-line, i.e., continuously during operation, so optimum chain tension always exists irrespective of the state of fullness.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A storage device with variable storage capacity, the storage device comprising:
    an input area;
    an output area;
    a continuous conveying element connecting the input area to the output area;
    the continuous conveying element being guided by guide elements in a looping manner from the input area to the output area, whereby the continuous conveying element defines a multi-layered storage area adapted to store products and a multi-layered return area adapted to be free of products;
    the multi-layered storage and return areas being arranged side by side and changing in length depending on a state of fullness of the storage device while an overall length of the continuous conveying element remains generally constant; and
    at least one storage layer of the multi-layered storage area and at least one storage layer of the multi-layered return area being arranged on a common horizontal plane.

2. The device of claim 1, wherein the storage device is adapted to store rod-shaped products.

3. The device of claim 1, wherein the storage device functions on a first in-first out manner.

4. The device of claim 1, wherein the multi-layered storage area comprises a full strand.

5. The device of claim 1, wherein the multi-layered return area comprises an empty strand.

6. The device of claim 1, wherein each storage layer of the multi-layered storage area and each storage layer of the multi-layered return area is arranged on a common horizontal plane.

7. The device of claim 1, wherein the multi-layered storage area and the multi-layered return area comprise separate guide elements.

8. The device of claim 1, wherein the guide elements of the multi-layered storage area are arranged on two disc towers.

9. The device of claim 8, wherein each of the two disc towers comprise a plurality of rotatably mounted storage discs arranged on a vertical spindle.

10. The device of claim 9, wherein at least one of the two disc towers can move relative to the other of the two disc towers.

11. The device of claim 9, wherein a first of the two disc towers is a stationary disc tower and a second of the two disc towers is a linearly movable disc tower.

12. The device of claim 11, wherein the second disc tower is movable along a generally horizontal plane.

13. The device of claim 1, wherein at least some of the guide elements are arranged on the multi-layered return area and are mounted on two plate towers.

14. The device of claim 13, wherein each of the two plate towers comprise a plurality of rotatably mounted plates arranged on a vertical spindle.

15. The device of claim 14, wherein at least one of the two plate towers is movably mounted.

16. The device of claim 14, wherein each of the two plate towers is movable along a generally horizontal plane.

17. The device of claim 1, further comprising a movable common slide unit comprising a plurality of plate towers and a disc tower.

18. The device of claim 17, wherein each plate tower comprises a plurality of plates and the disc tower comprises a plurality of storage discs.

19. The device of claim 18, wherein each of the plurality of plates comprises a diameter that is substantially smaller than a diameter of the plurality of storage discs.

20. The device of claim 1, wherein at least some of the guide element comprise a plurality of stationary rotatably mounted reversing rollers.

21. The device of claim 20, wherein each of the plurality of stationary rotatably mounted reversing rollers is mounted on a horizontal spindle.

22. The device of claim 1, wherein the continuous conveying element comprises a continuous chain.

23. The device of claim 1, further comprising a drive for driving the continuous conveying element, wherein the drive is arranged in the input area.

24. The device of claim 1, further comprising a drive for driving the continuous conveying element, wherein the drive is arranged in the output area.

25. The device of claim 1, further comprising a first drive for driving the continuous conveying element arranged in the input area and a second drive for driving the continuous conveying element arranged in the output area.

26. The device of claim 1, wherein the guide elements comprise a movable disc tower and an inlet disc arranged above a stationary disc tower and an outlet disc, wherein a diameter of the inlet disc is greater than a diameter of the outlet disc, and wherein the diameter of the outlet disc is greater than a diameter of storage discs of each of the movable and stationary disc towers.

27. The device of claim 1, wherein the guide elements comprise an inlet disc arranged above a stationary disc tower and an outlet disc, wherein a diameter of the inlet disc is greater than a diameter of the outlet disc, and wherein the diameter of the outlet disc is greater than a diameter of storage discs of the stationary disc tower.

28. The device of claim 27, wherein the storage discs of the stationary disc tower, the inlet disc and the outlet disc are inclined at an angle relative to a generally horizontal plane.

29. The device of claim 28, wherein the angle comprises approximately 3.5 degrees.

30. The device of claim 1, wherein the guide elements comprise a stationary disc tower, a movable disc tower, and a plurality of plate towers supported on spindles.

31. The device of claim 1, further comprising guide sheets wherein the continuous conveying element is guided along two longitudinal sides of the storage device via the guide sheets.

32. The device of claim 1, further comprising a system for varying the length of the multi-layered storage area and the multi-layered return area, whereby the system is adapted to vary a storage capacity of the storage device.

33. The device of claim 32, wherein the system is adapted to vary the storage capacity automatically.

34. The device of claim 32, wherein the system regulates a difference in speed between a drive arranged in the input area and a drive arranged in the output area.

35. The device of claim 1, further comprising at least one tensioning system adapted to tension the continuous conveying element.

36. The device of claim 35, wherein the at least one tensioning system comprises a frame, a tensioning bar, a weight, a tension member, a tensioning roller, and a reversing roller.

37. A method of storing rod-shaped products using the device of claim 1, the method comprising;
   feeding the rod-shaped products to the input area;
   positioning the rod-shaped articles onto the continuous conveying element; and
   guiding the continuous conveying element with the guide elements to the output area.

38. A method of conveying rod-shaped products between a first machine and a second machine using the device of claim 1, the method comprising;
   feeding, from the first machine, the rod-shaped products to the input area;
   positioning the rod-shaped articles onto the continuous conveying element;
   guiding the continuous conveying element with the guide elements to the output area; and
   feeding, from the output area, the rod-shaped products to the second machine.

39. A method of conveying rod-shaped products between a cigarette making machine and a cigarette packing machine using the device of claim 1, the method comprising;
   feeding, from the cigarette making machine, the rod-shaped products to the input area;
   positioning the rod-shaped articles onto the continuous conveying element;
   guiding the continuous conveying element with the guide elements to the output area; and
   feeding, from the output area, the rod-shaped products to the cigarette packing machine.

* * * * *